United States Patent
Wang et al.

(10) Patent No.: US 12,015,884 B2
(45) Date of Patent: Jun. 18, 2024

(54) METHOD OF LAYER BLENDING AND RECONSTRUCTION BASED ON THE ALPHA CHANNEL

(71) Applicant: NOVATEK MICROELECTRONICS CORP., Hsinchu (TW)

(72) Inventors: Hung-Ming Wang, Tainan (TW); Yuan-Po Cheng, Zhubei (TW)

(73) Assignee: Novatek Microelectronics Corp., Hsinchu (TW)

( * ) Notice: Subject to any disclaimer, the term of this patent is extended or adjusted under 35 U.S.C. 154(b) by 396 days.

(21) Appl. No.: 17/179,440

(22) Filed: Feb. 19, 2021

(65) Prior Publication Data

US 2022/0159226 A1 May 19, 2022

Related U.S. Application Data

(60) Provisional application No. 63/113,198, filed on Nov. 13, 2020.

(51) Int. Cl.
*H04N 9/76* (2006.01)
*H04N 9/64* (2023.01)
*H04N 19/44* (2014.01)

(52) U.S. Cl.
CPC ............ *H04N 9/76* (2013.01); *H04N 9/646* (2013.01); *H04N 19/44* (2014.11)

(58) Field of Classification Search
None
See application file for complete search history.

(56) References Cited

U.S. PATENT DOCUMENTS

| 8,358,379 B1 | 1/2013 | Woodall | |
|---|---|---|---|
| 2009/0310947 A1* | 12/2009 | Chillie | H04N 9/76 |
| | | | 386/300 |
| 2018/0255264 A1* | 9/2018 | Kwon | H04N 21/47 |
| 2019/0149792 A1* | 5/2019 | Luo | H04N 9/76 |
| | | | 348/571 |

OTHER PUBLICATIONS

Kwak, Hanock, and Byoung-Tak Zhang. "Generating images part by part with composite generative adversarial networks." arXiv preprint arXiv:1607.05387 (2016) (Year: 2016).*

* cited by examiner

*Primary Examiner* — Stuart D Bennett
(74) *Attorney, Agent, or Firm* — JCIPRNET (57) ABSTRACT

A device and method for blending image data and the alpha channel and reconstructing to obtain the image again after transmission. An encoder blends the alpha channel and the red-green-blue (RGB) image data through a layer blending method that is supported by the general application processor (AP). Transporter image data, such as a checkerboard pattern, is blended with 1-alpha channel data to obtain a transporter. The blended image data (RGB+alpha) is mixed with the transporter to obtain mixed image data. The mixed image data is then transmitted through the existing transmission interface. After receiving the mixed image data, reconstruction processing is performed by a decoder to obtain the original RGB image data and the alpha channel again.

15 Claims, 13 Drawing Sheets

METHOD OF LAYER BLENDING AND RECONSTRUCTION BASED ON THE ALPHA CHANNEL

CROSS-REFERENCE TO RELATED APPLICATION

This non-provisional application claims priority under 35 U.S.C. § 119(e) on U.S. provisional Patent Application No(s). 63/113,198 filed on Nov. 13, 2020, the entire contents of which are hereby incorporated by reference.

BACKGROUND OF THE INVENTION

1. Field of the Invention

The present disclosure relates to video processing, and in particular to a device and method for blending image data and the alpha channel and reconstructing to obtain the image again after transmission.

2. Description of the Related Art

When performing video processing, if the data of different layers can be processed separately, and then overlapped after processing, better processing results can be obtained In order to be able to overlap after processing, in addition to image data, an Alpha channel (transparency) is required during transmission.

One possible solution is to use the existing RGB three-channel and transmit the rearranged ARGB four-channel data, and rearrange the ARGB after receiving it. This method is incompatible with the existing encoder, and requires an additional processing mechanism and takes up a large bandwidth.

Additionally, common video transmission interfaces (HDMI, MIPI) only support the transmission of image data, and do not support the transmission of alpha data while transmitting images.

Another possible solution is to use two images to transmit RGB image data and alpha channel respectively, and process the two images to restore ARGB images after receiving them. This method requires twice the bandwidth data volume.

Therefore, it is desirable to have improvements in video processing to process different image layers separately by blending the alpha channel (transparency) with the image data for transmission.

BRIEF SUMMARY OF THE INVENTION

An objective of the present disclosure is to provide a device and method for layer blending and reconstruction based on the alpha channel.

The present invention blends the alpha channel and the red-green-blue (RGB) image data through a layer blending method that is supported by the general application program (AP). The blended data (RGB+alpha) is then transmitted through the existing transmission interface. After receiving the blended data, reconstruction processing is performed to obtain the original RGB image data and the alpha channel again.

Advantageously, the present invention reduces bandwidth requirements, transmission loading, data volume, and transmission time.

The device and method for blending image data and the alpha channel and reconstructing to obtain the image again after transmission of the present invention comprises an encoder and a decoder. The encoder and the decoder comprise electronic circuits that are integrated into separate integrated circuits (IC) or integrated into the same integrated circuit (IC).

The encoder performs layer blending of the RGB image data and the alpha channel data to obtain blended image data (RGB+alpha channel). The blended image data is transmitted using a standard transmission interface. Since the blended image data is obtained utilizing a layer blending method that is supported by the general application program (AP), the blended image data can be transmitted similarly to standard RGB image data via a standard transmission interface.

In an embodiment of the present invention, the method of layer blending and reconstruction based on an alpha channel comprises, layer blending the alpha channel and red-green-blue (RGB) image data to obtain blended image data; blending transporter image data with 1-alpha channel data to obtain a transporter; and blending the transporter with the blended image data to obtain mixed image data.

In an embodiment, the RGB image data comprises 30-bit RGB image data. In an embodiment, the RGB image data comprises 24-bit RGB image data. In an embodiment, the RGB image data comprises greater than 30-bit RGB image data. In an embodiment the alpha channel comprises 8-bit alpha channel data. In an embodiment the alpha channel comprises greater than 8-bit alpha channel data. In an embodiment of the present invention the transporter image data comprises 24-bit, 30-bit, or greater than 30-bit transporter image data. In an embodiment the 1-alpha channel data comprises 8-bit data or greater than 8-bit 1-alpha channel data. In an embodiment the mixed image data comprises 24-bit, 30-bit, or greater than 30-bit mixed image data. In an embodiment of the present invention, the transporter image data comprises a checkerboard pattern. In an embodiment the transporter image data comprises a colored checkerboard pattern.

In an embodiment of the present invention, the method of layer blending and reconstruction based on an alpha channel comprises: receiving mixed image data; removing transporter image data from the mixed image data to obtain blended image data; and reconstructing red-green-blue (RGB) image data and the alpha channel from the blended image data.

In an embodiment of the present invention, the method of layer blending and reconstruction based on an alpha channel comprises, for decoding processing, $C_{r1}$=RGB*alpha, $C_{r2}$=RGB*alpha+255*(1-alpha), and alpha=$1+(C_{r1}-C_{r2})/255$; wherein $C_{r1}$ is obtained from $C_{r2}$ in left, right, top, and bottom positions; and wherein different costs are calculated to determine interpolation direction.

In an embodiment of the present invention, the method of layer blending and reconstruction based on an alpha channel comprises: receiving mixed image data; determining if a mode flag is set, the mode flag indicating ARGB mode when set and RGB mode when not set; performing a cost calculation when in ARGB mode; performing a $C_{r1}/C_{r2}$ estimation; performing an alpha calculation; performing alpha smoothing; and performing ARGB reconstruction based on the $C_{r1}/C_{r2}$ estimation, the alpha smoothing, and transporter image data.

The present invention provides an electronic device for layer blending and reconstruction based on an alpha channel comprising an encoder for layer blending the alpha channel and red-green-blue (RGB) image data to obtain blended image data; blending transporter image data with 1-alpha channel data to obtain a transporter; and blending the transporter with the blended image data to obtain mixed image data.

The present invention provides an electronic device for layer blending and reconstruction based on an alpha channel comprising a decoder for receiving mixed image data; removing transporter image data from the mixed image data to obtain blended image data; and reconstructing red-green-blue (RGB) image data and the alpha channel from the blended image data.

In an embodiment of the present invention, the electronic device for layer blending and reconstruction based on an alpha channel, for decoder processing, $C_{r1}$=RGB*alpha, $C_{r2}$=RGB*alpha+255*(1-alpha), and alpha=1+($C_{r1}$-$C_{r2}$)/255; wherein $C_{r1}$ is obtained from $C_{r2}$ in left, right, top, and bottom positions; and wherein different costs are calculated to determine interpolation direction.

In embodiments, the present invention provides an electronic device for layer blending and reconstruction based on an alpha channel comprising: an encoder for layer blending the alpha channel and red-green-blue (RGB) image data to obtain blended image data; blending transporter image data with 1-alpha channel data to obtain a transporter; blending the transporter with the blended image data to obtain mixed image data; and transmitting the mixed image data to a decoder; and the decoder for receiving the mixed image data from the encoder; removing the transporter from the mixed image data to obtain blended image data; and reconstructing the red-green-blue (RGB) image data and the alpha channel from the blended image data.

In embodiments of the present invention the encoder and the decoder are provided in a single integrated circuit. In embodiments of the present invention the encoder and the decoder are separate integrated circuits.

In embodiments of the present invention, the encoder and the decoder are located locally to each other, for example, in the same electronic device or electronic circuitry.

In embodiments of the present invention, the encoder and the decoder are located remotely from each other and are disposed in separate electronic devices or electronic circuitry.

In embodiments of the present invention, the mixed image data is transmitted from the encoder or encoder system via a network or the internet.

In embodiments of the present invention, the mixed image data is received by the decoder or decoder system via a network or the internet.

In an embodiment of the present invention the decoding and reconstruction processing flow comprises the decoder receiving input data. The input data comprises, for example, RGB image data or mixed image data. The mixed image data comprises RGB image data and alpha channel data. At the same time or before, the decoder also receives a mode flag. The decoder determines if the mode flag represents that the input data is RGB image data or that the input data is mixed image data.

If the decoder determines that the mode flag indicates that the input data is RGB image data (RGB mode), the input data (RGB image data) is output as RGB data to the data processing system and the processing system utilizes the RGB image data in the standard method of processing image data. The system comprises, for example, a microcontroller, a CPU, GPU, graphics card, or external electronic components.

If the decoder determines that the mode flag indicates that the input data is mixed image data (ARGB mode), then the input data proceeds to further processing as mixed image data. Cost calculation processing is performed on the mixed data (ARGB) and the cost calculation results data is used along with the transporter data in performing a $C_{r1}$/$C_{r2}$ estimation process.

The $C_{r1}$/$C_{r2}$ estimation results are used to perform an alpha channel calculation process. The results of the alpha channel calculation process are used to perform an alpha channel smoothing process.

The transporter data, the $C_{r1}$/$C_{r2}$ estimation results, and the results of the alpha channel smoothing process are used to perform an ARGB reconstruction process. After the ARGB reconstruction process is complete, the original RGB image data and the original alpha channel data are obtained.

To achieve at least the above objectives, the present disclosure provides a device and method for blending RGB image data and the alpha channel, transmitting the blended image data, and reconstructing to obtain the RGB image and alpha channel again after transmission.

DETAILED DESCRIPTION OF THE INVENTION

To facilitate understanding of the object, characteristics and effects of this present disclosure, embodiments together with the attached drawings for the detailed description of the present disclosure are provided.

Following are details of embodiments of the present invention.

Figure 1:
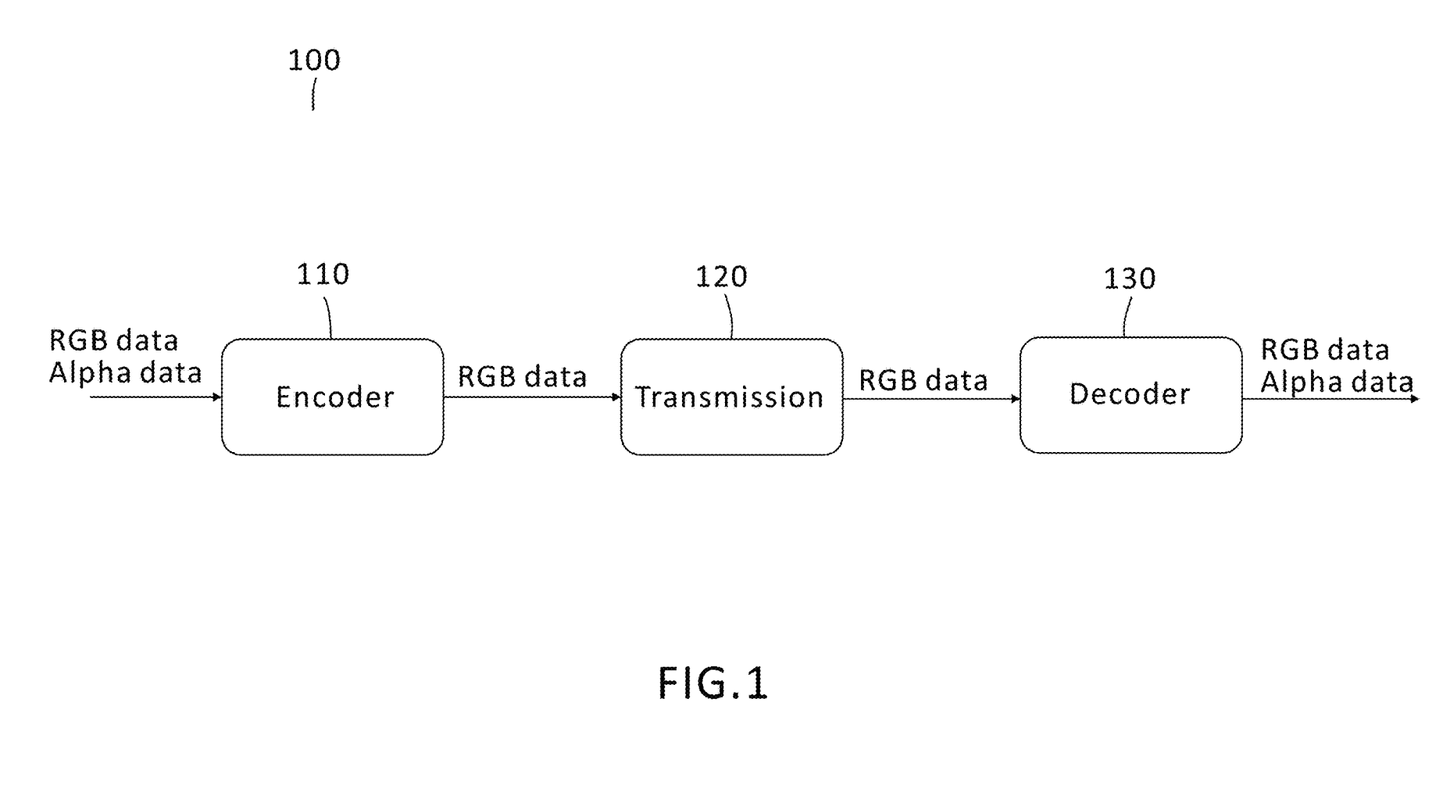
FIG. 1 is a drawing illustrating video processing flow of a method for blending image data and the alpha channel and reconstructing to obtain the image again after transmission according to an embodiment of the present invention.

Refer to FIG. 1, which is a drawing illustrating video processing flow of a method for blending image data and the alpha channel and reconstructing to obtain the image again after transmission according to an embodiment of the present invention.

In the method 100, initially, RGB image data and alpha channel data are provided to an encoder 110. The encoder 110 encodes the RGB image data and the alpha channel data to obtain blended RGB data. The blended RGB data is transmitted 120 to a decoder 130. The decoder 130 decodes the blended RGB data to obtain the original RGB image data and the original alpha channel again.

Figure 2:
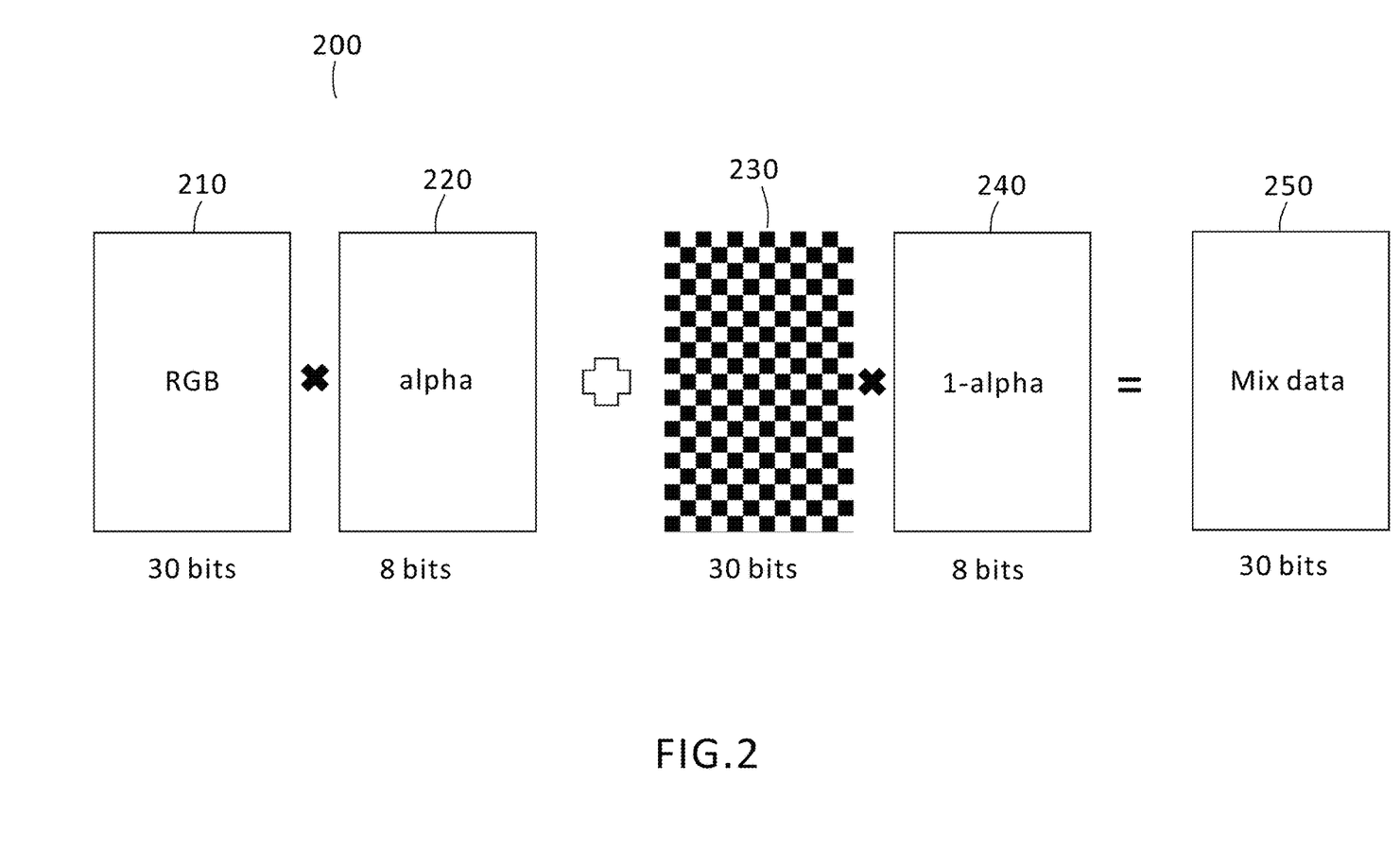
FIG. 2 is a diagram illustrating a layer blending encoding process according to an embodiment of the present invention.

Refer to FIG. 2, which is a diagram illustrating a layer blending encoding process according to an embodiment of the present invention.

In the layer blending encoding process method 200 illustrated in FIG. 2, initially, the device and method for blending image data and the alpha channel and reconstructing to obtain the image and alpha channel again after transmission, the encoder (FIG. 1, 110) performs the encoder processing. The 30/24-bit RGB image data 210 is blended with the 8-bit alpha channel data 220 to obtain blended image data. Also, transporter image data 230, for example a checkerboard pattern, is blended with 1-alpha channel data 240 to obtain a transporter. Then, the blended image data is combined with the transporter to obtain 30/24-bit mixed data 250. In an embodiment, the transporter image data 230 comprises a black and white checkerboard pattern. In an embodiment, the transporter image data 230 comprises a color checkerboard pattern.

The 30/24-bit mixed data 250 is now encoded and ready for transmission.

In embodiments of the present invention the RGB image data 210 comprises a different number of bits other than 30 bits or 24 bits as used in this embodiment.

In embodiments of the present invention the alpha channel data 220 comprises a different number of bits other than 8 bits as used in this embodiment.

In embodiments of the present invention the transporter image data 230 comprises a different number of bits other than 30 bits or 24 bits as used in this embodiment.

In embodiments of the present invention the 1-alpha channel data 240 comprises a different number of bits other than 8 bits as used in this embodiment.

In embodiments of the present invention the mixed data 250 comprises a different number of bits other than 30 bits or 24 bits as used in this embodiment.

Figure 3:
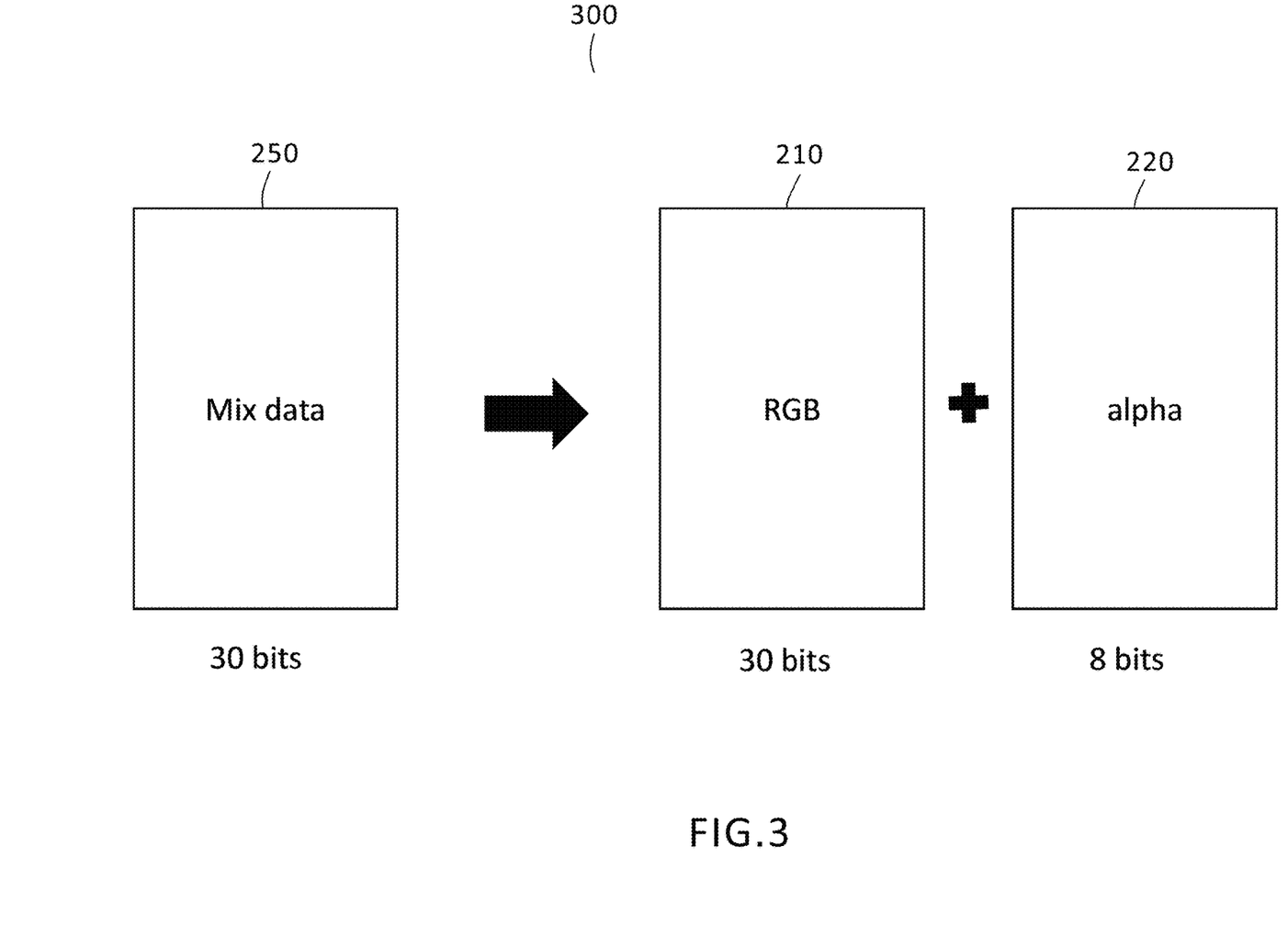
FIG. 3 is a diagram illustrating a reconstruction decoding process according to an embodiment of the present invention.

Refer to FIG. 3, which is a diagram illustrating a reconstruction decoding process method according to an embodiment of the present invention.

The reconstruction decoding process method 300 illustrated in FIG. 3, the decoder (FIG. 1, 130) performs reconstruction processing on the received 30/24-bit mixed data 250 to obtain the original 30/24-bit RGB image data 210 and the original 8-bit alpha channel data 220 again.

During the reconstruction processing the transporter (FIG. 2, transporter image data 230×1-alpha channel data 240) is extracted from the mixed data 250 to obtain the blended image data (FIG. 2, RGB image data 210× alpha channel data 220). Then, the alpha channel data and the RGB image data are decoded from the blended image data to obtain the original RGB image data 210 and the original alpha channel data 220.

Figure 4:
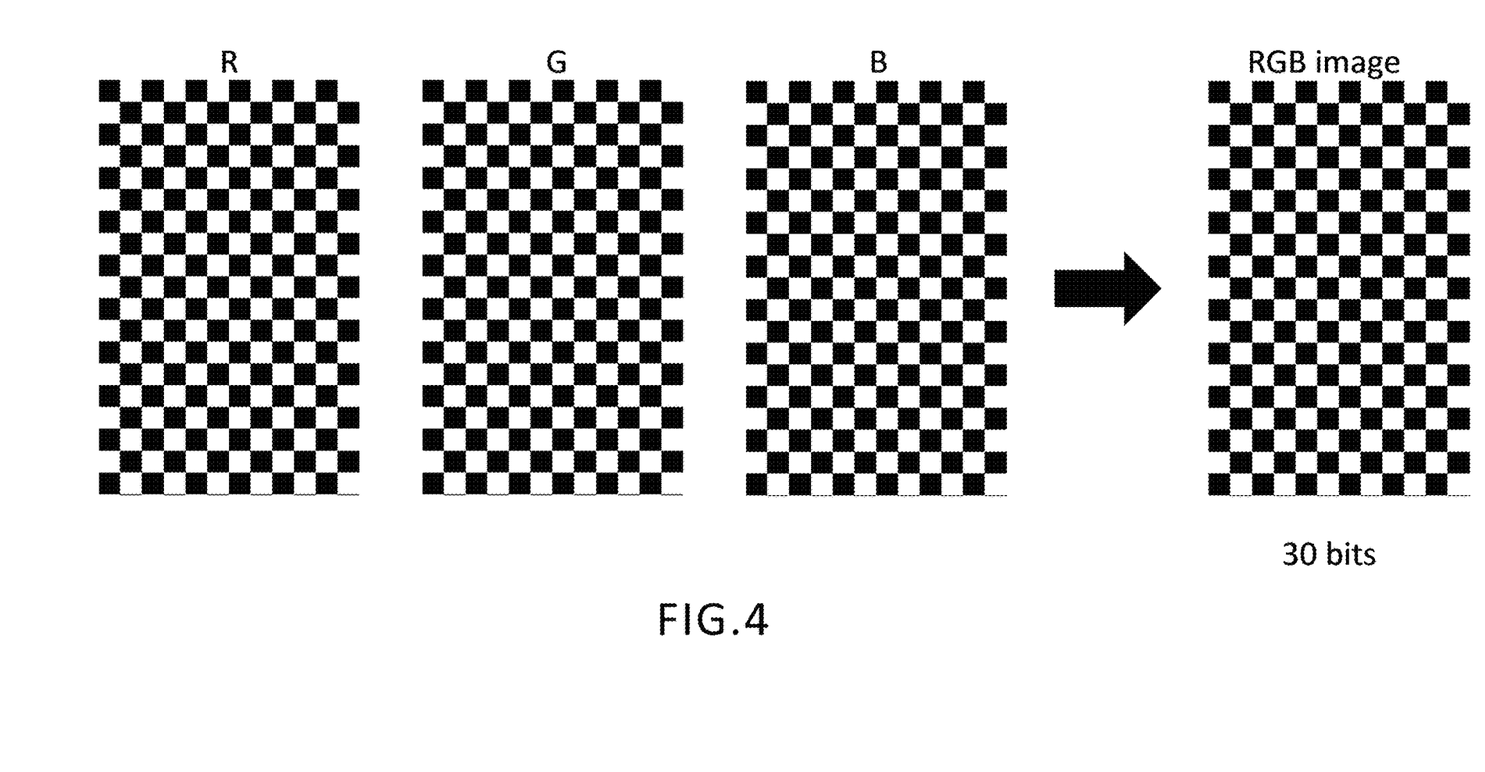
FIG. 4 is a diagram illustrating a checkerboard transporter image data process according to an embodiment of the present invention.
Figure 5:
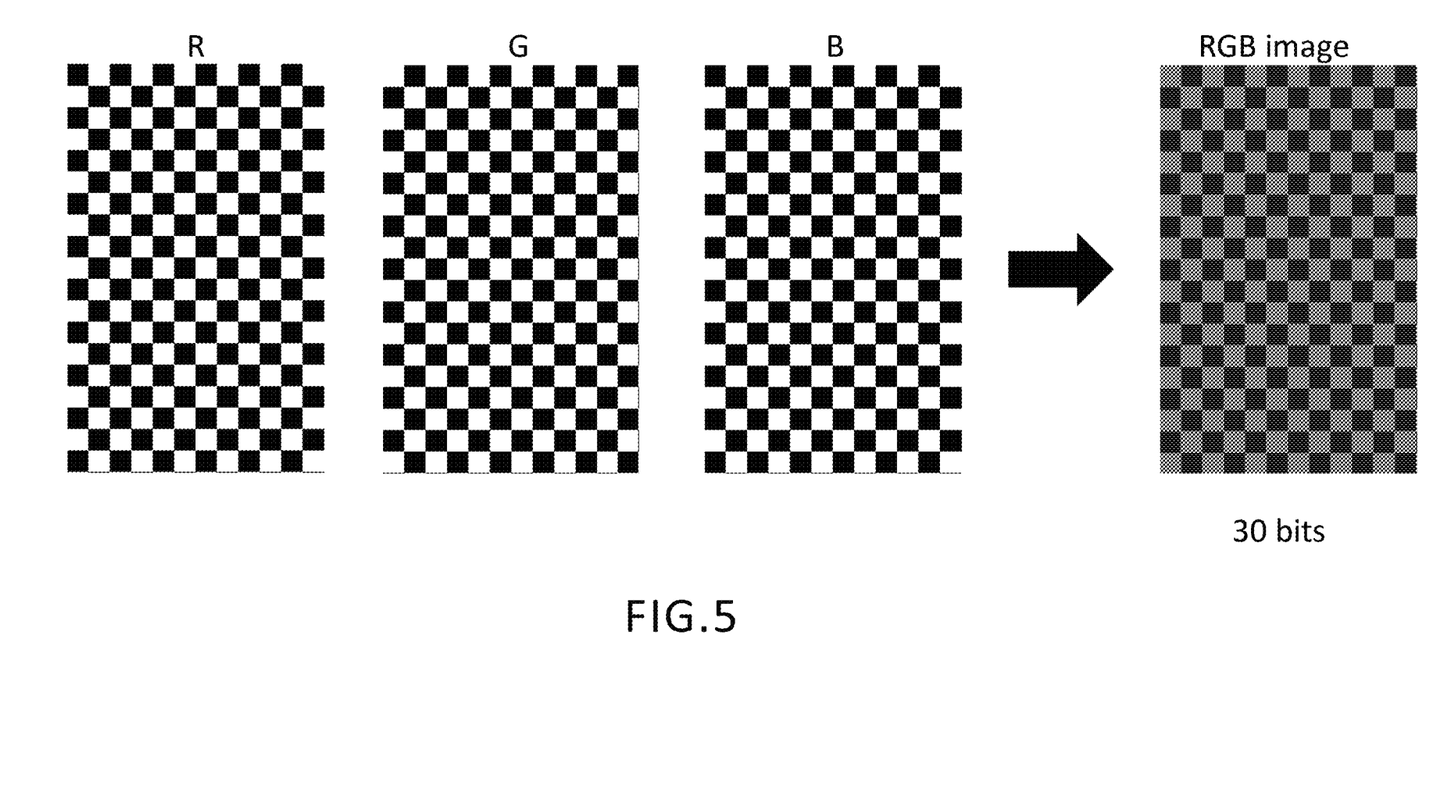
FIG. 5 is a diagram illustrating a color checkerboard transporter image data process according to an embodiment of the present invention.

Refer to FIG. 4, which is a diagram illustrating a checkerboard transporter image data process according to an embodiment of the present invention and refer to FIG. 5, which is a diagram illustrating a color checkerboard transporter image data process according to an embodiment of the present invention.

In the embodiment illustrated in FIG. 4, the transporter (FIG. 2, transporter image data 230×1-alpha channel data 240) comprises black and white checkerboard image data.

In the embodiment illustrated in FIG. 5, the transporter (FIG. 2, transporter image data 230×1-alpha channel data 240) comprises color checkerboard image data.

Figure 6:
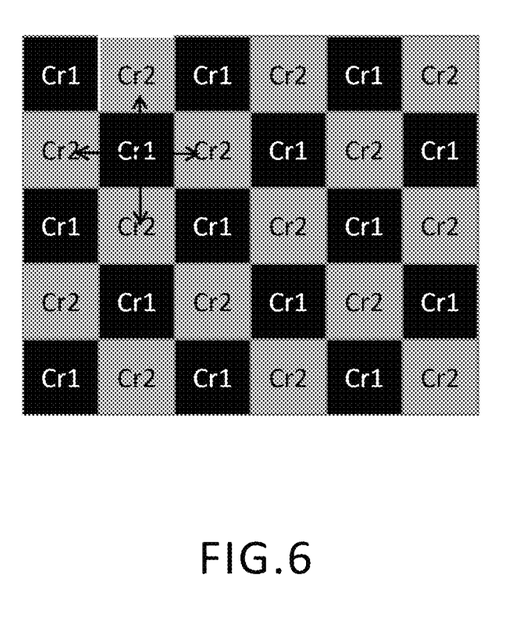
FIG. 6 is a diagram illustrating a $C_{r1}$ and $C_{r2}$ pixel pattern according to an embodiment of the present invention.

Refer to FIG. 6, which is a diagram illustrating a $C_{r1}$ and $C_{r2}$ pixel pattern according to an embodiment of the present invention.

In the decoder processing, $C_{r1}$=RGB*alpha and $C_{r2}$=RGB*alpha+255*(1-alpha) are located in different pixel/subpixel coordinates within mixed image data. The $C_{r1}$ and $C_{r2}$ values at the same pixel/subpixel coordinates within the mixed image data will be first reconstructed, then the alpha can be calculated by alpha=1+($C_{r1}$-$C_{r2}$)/255.

The decoder processing comprises:

$C_{r1}$ is obtained from $C_{r2}$ in left, right, top, and bottom positions;

Different costs are calculated to determine the interpolation direction;

$C_{r1}$ & $C_{r2}$ reconstruction is performed;

alpha reconstruction is performed; and

RGB reconstruction is performed.

Figure 7:
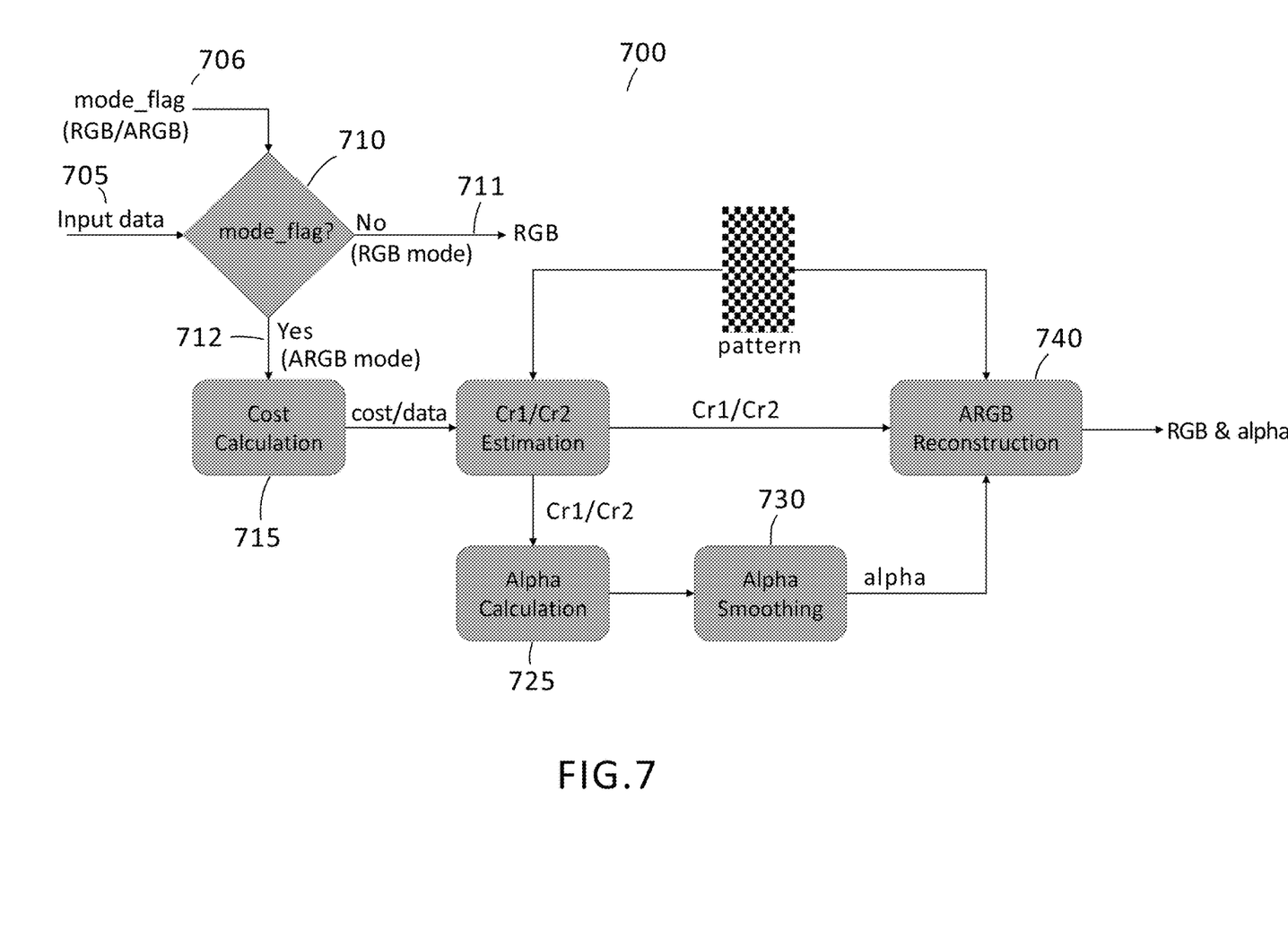
FIG. 7 is a flowchart illustrating a process flow of a decoder according to an embodiment of the present invention.

Refer to FIG. 7, which is a flowchart illustrating a process flow of a decoder according to an embodiment of the present invention.

The decoding process flow 700 illustrated in FIG. 7 comprises receiving input data by the decoder in Step 705. The input data comprises, for example, RGB image data or mixed image data. The mixed image data comprises RGB image data and alpha channel data.

The decoder also receives a mode flag in Step 706. In Step 710, the decoder determines if the mode flag represents that the input data is RGB image data or that the input data is mixed image data.

If the decoder determines that the mode flag indicates that the input data is RGB image data (RGB mode), the input data (RGB image data) is output as RGB image data to the image processing system in Step 711 and the image processing system utilizes the RGB image data in the standard method of processing image data.

If the decoder determines that the mode flag indicates that the input data is mixed image data (ARGB mode), then the input data continues processing as mixed image data in Step 712.

In Step 715, cost calculation processing is performed on the mixed data (ARGB) and the cost calculation results data is used along with the transporter data in performing a $C_{r1}$/$C_{r2}$ estimation process in Step 720.

In Step 725, the $C_{r1}$/$C_{r2}$ estimation results are used to perform an alpha channel calculation process. The results of the alpha channel calculation process are used to perform an alpha channel smoothing process in Step 730.

The transporter data, the $C_{r1}/C_{r2}$ estimation results, and the results of the alpha channel smoothing process are used to perform an ARGB reconstruction process in Step 740. As a result of the ARGB reconstruction process, the original RGB image data and the original alpha channel data are obtained.

Figure 8:
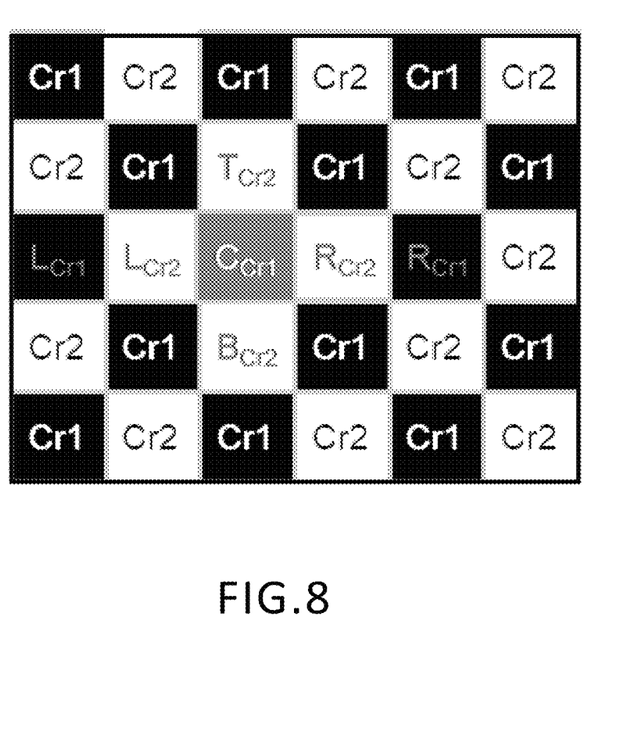
FIG. 8 is a diagram illustrating a Left, Right, Top, and Bottom $C_{r1}$ and $C_{r2}$ pixel pattern according to an embodiment of the present invention.
Figure 9:
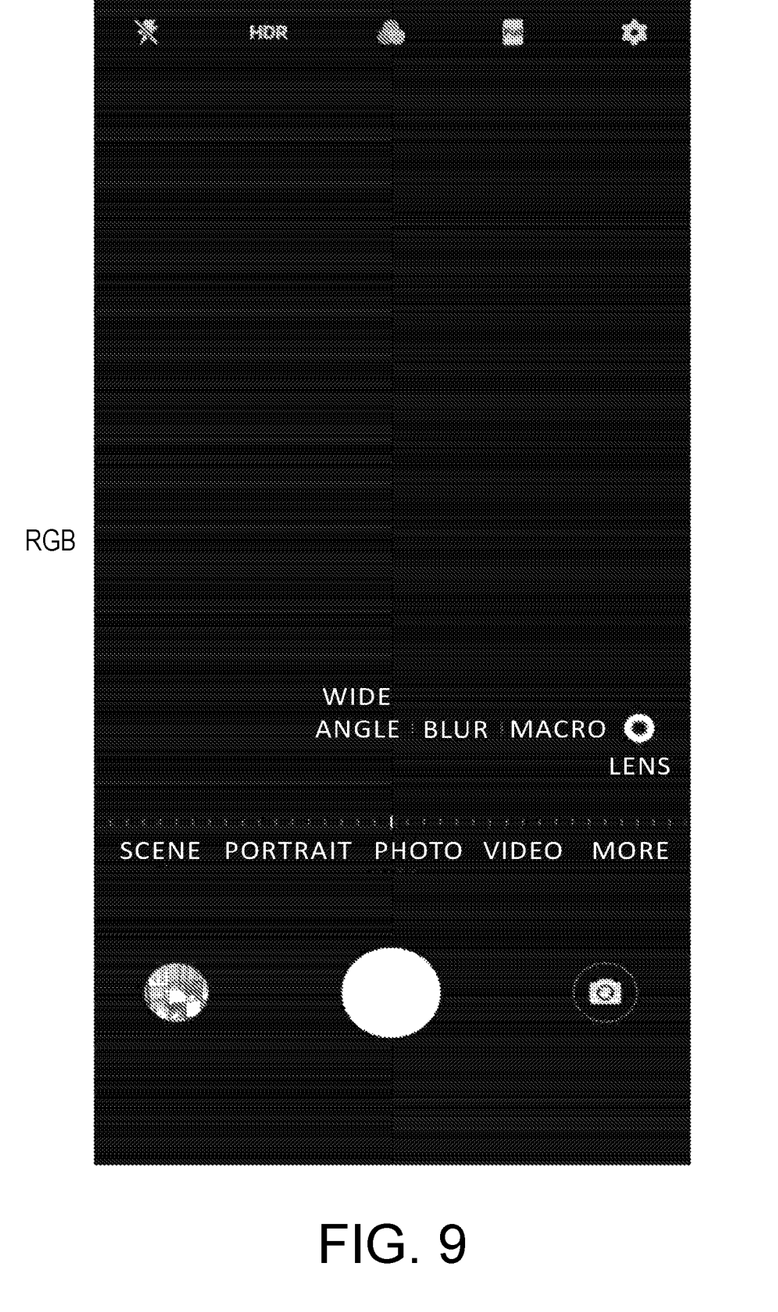
FIG. 9 is a diagram illustrating RGB image data of the device and method for blending image data and the alpha channel and reconstructing to obtain the image again after transmission according to an embodiment of the present invention.
Figure 10:
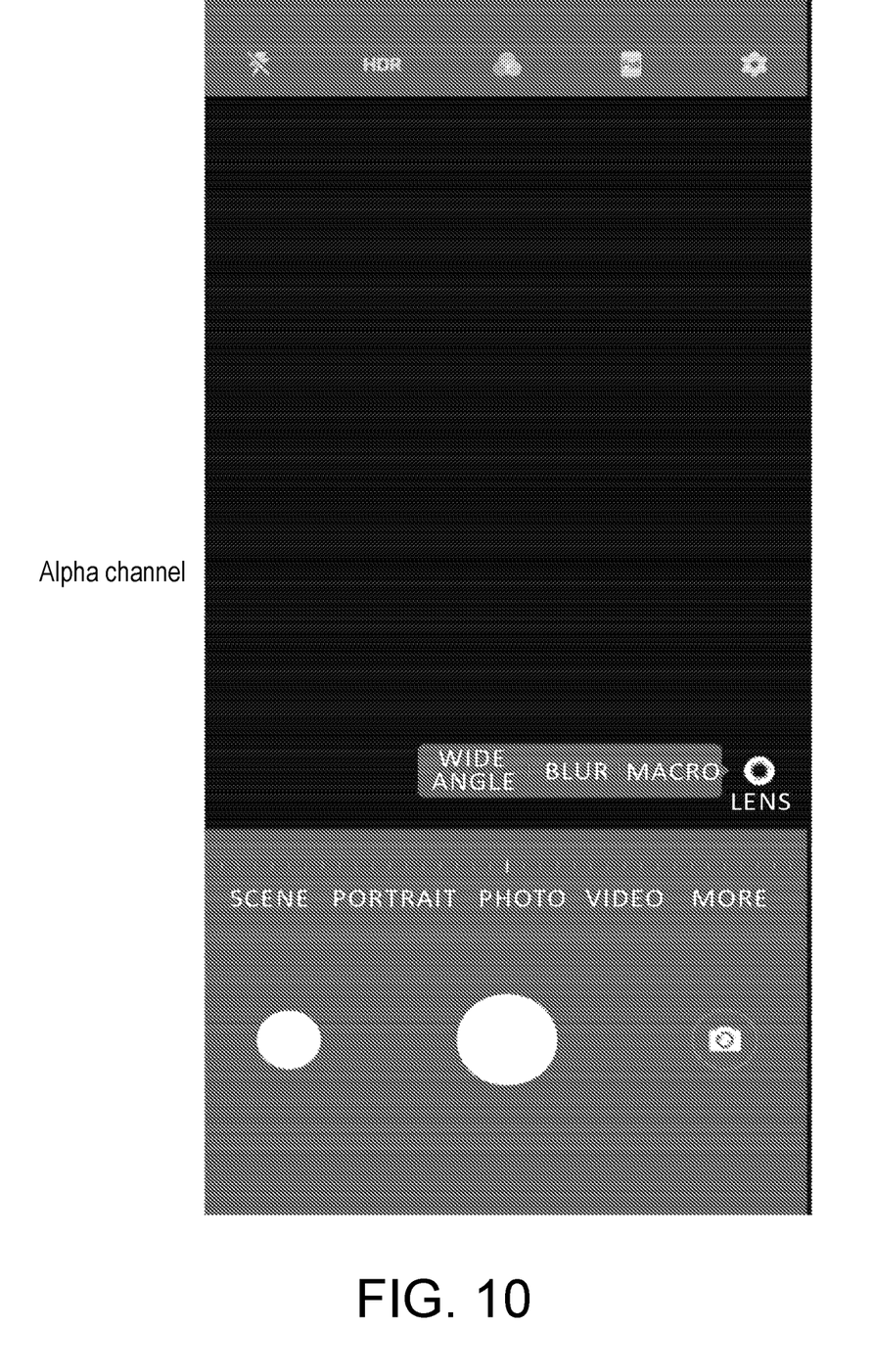
FIG. 10 is a diagram illustrating alpha channel data of the device and method for blending image data and the alpha channel and reconstructing to obtain the image again after transmission according to an embodiment of the present invention.
Figure 11:
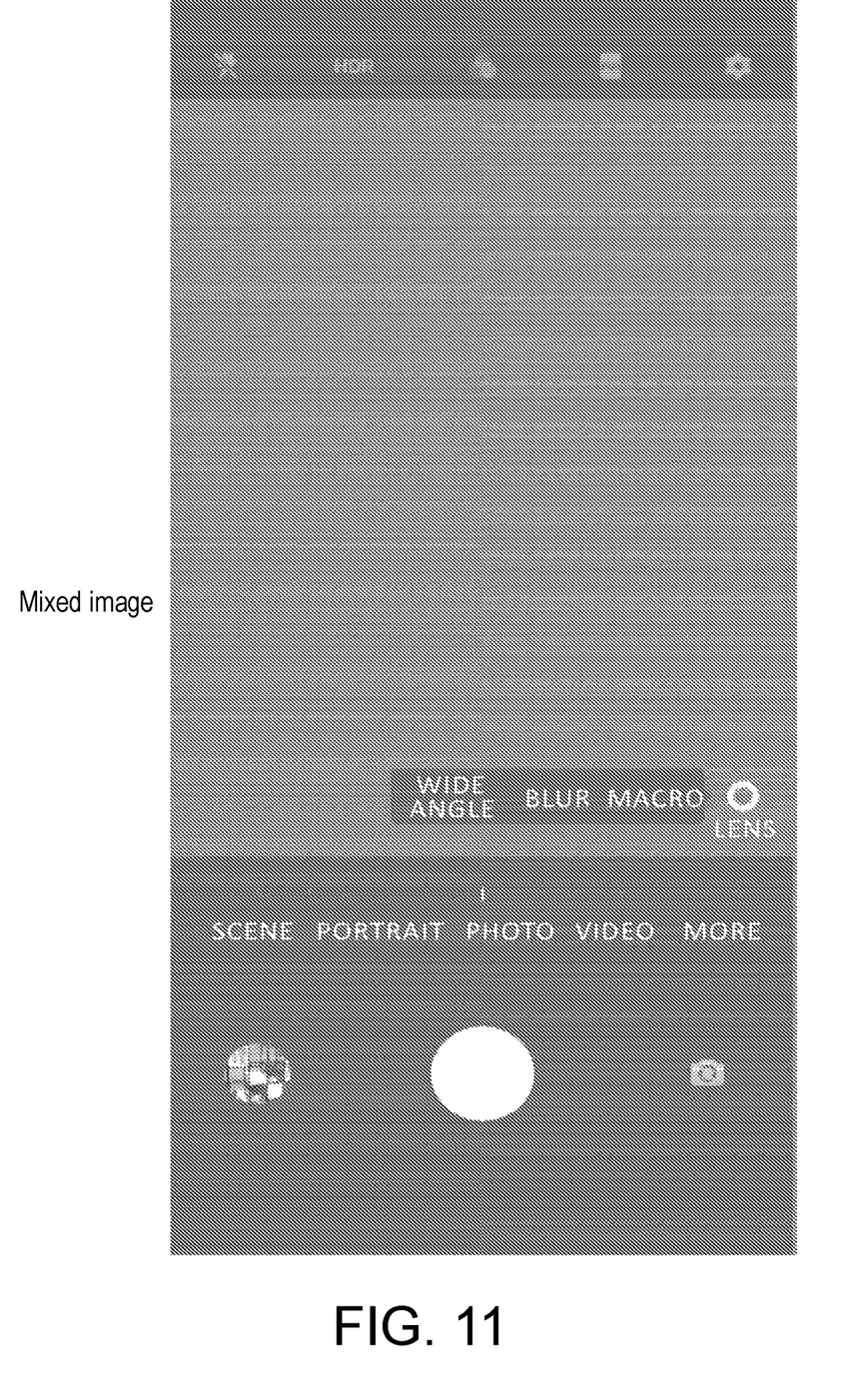
FIG. 11 is a diagram illustrating mixed image data (RGB+alpha channel blended) of the device and method for blending image data and the alpha channel and reconstructing to obtain the image again after transmission according to an embodiment of the present invention.
Figure 12:
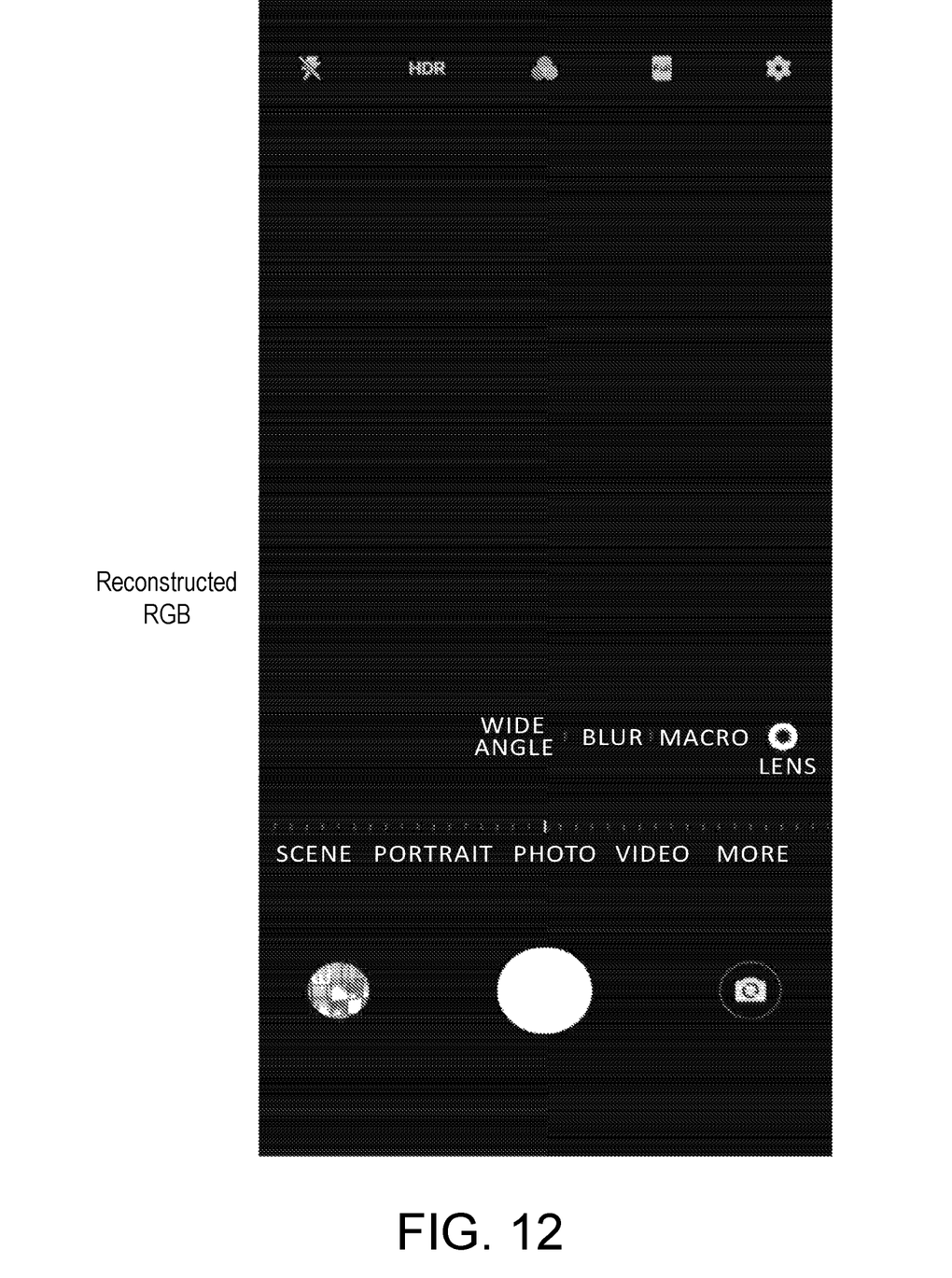
FIG. 12 is a diagram illustrating reconstructed RGB simulation results of the device and method for blending image data and the alpha channel and reconstructing to obtain the image again after transmission according to an embodiment of the present invention.
Figure 13:
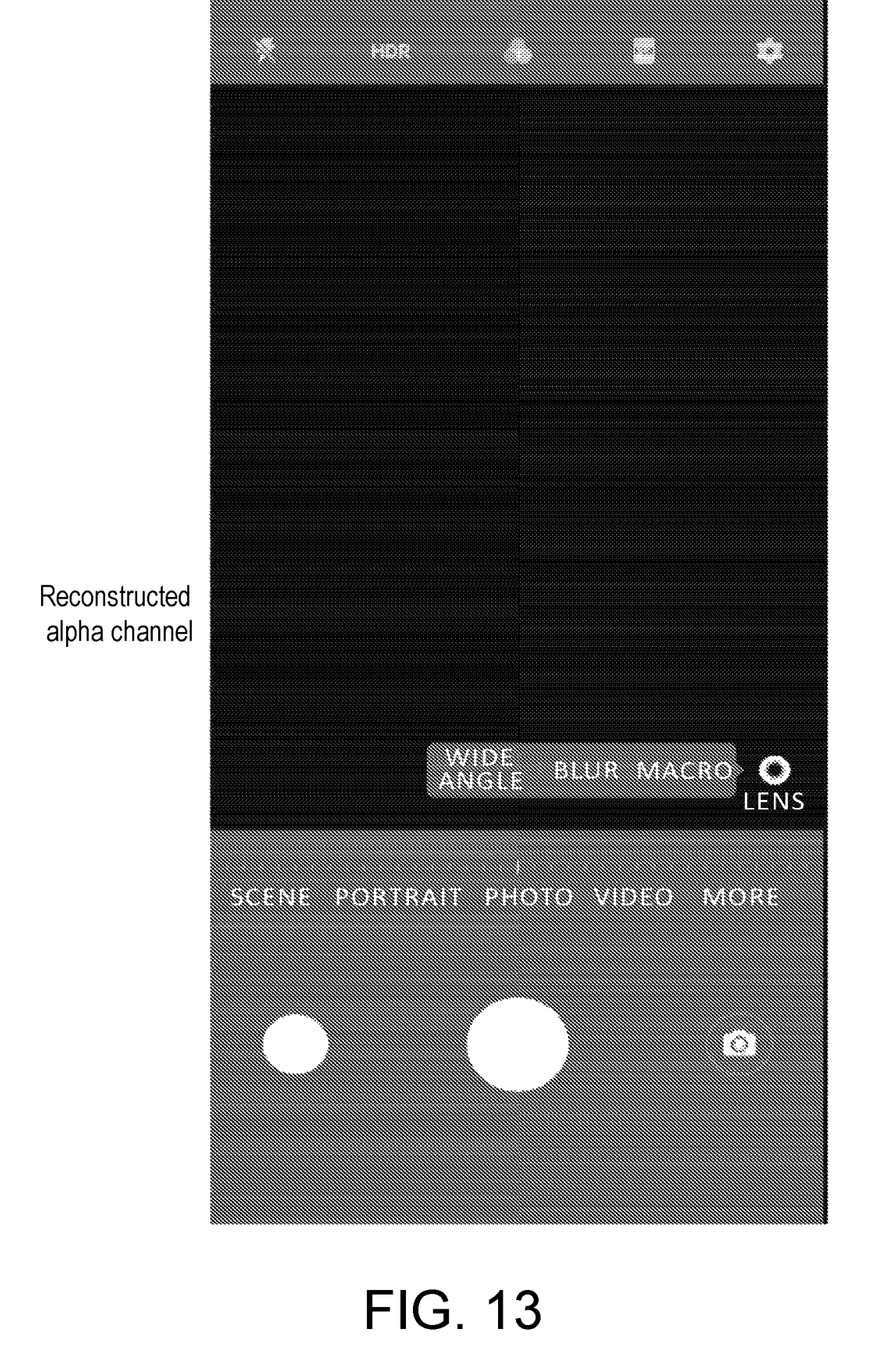
FIG. 13 is a diagram illustrating reconstructed alpha channel simulation results of the device and method for blending image data and the alpha channel and reconstructing to obtain the image again after transmission according to an embodiment of the present invention.

Refer to FIG. 8, which is a diagram illustrating a Left, Right, Top, and Bottom $C_{r1}$ and $C_{r2}$ pixel pattern according to an embodiment of the present invention.

In order to determine the interpolation direction, different costs need to be calculated. The cost calculation comprises:

Input:

$$L_{Cr2}, T_{Cr2}, R_{Cr2}, B_{Cr2}, L_{Cr1}, R_{Cr1}$$

Candidate:

$$LR\_value = (L_{Cr2} + R_{Cr2} + 1) >> 1$$

$$TB\_value = (T_{Cr2} + B_{Cr2} + 1) >> 1$$

Cost:

$$LR\_cost = abs(L_{Cr2} - R_{Cr2})$$

$$TB\_cost = abs(T_{Cr2} - B_{Cr2})$$

$$LC\_cost = abs(L_{Cr1} - C_{Cr1})$$

$$RC\_cost = abs(R_{Cr1} - C_{Cr1})$$

In the above, $L_{Cr2}$ is the Left$_{Cr2}$, $T_{Cr2}$ is the Top$_{Cr2}$, $R_{Cr2}$ is the Right$_{Cr2}$, $B_{Cr2}$ is the Bottom$_{Cr2}$, $L_{Cr1}$ is the Left$_{Cr1}$, and $R_{Cr1}$ is the Right$_{Cr1}$.

In the above, LR_value is the Left Right value, and TB_value is the Top Bottom value.

In the above, abs is the absolute value, LR_cost is the Left Right cost, TB_cost is the Top Bottom cost, LC_cost is the Left Center cost, and RC_cost is the Right Center cost.

In order to perform $C_{r1}$ & $C_{r2}$ reconstruction, an estimation process is performed. The $C_{r2}$ estimation (the same process for $C_{r1}$) comprises:

```
if (LR_cost<th1 && TB_cost<th1)
    if (LC_cost<=th2 || RC_cost<=th2)
        C_cr2=LR_value;
    else
        C_cr2=TB_value;
    end
elseif (LR_cost<=TB_cost)
    C_cr2=LR_value;
else
    C_cr2=TB_value;
end
```

In order to perform alpha reconstruction, an alpha calculation process is performed. The alpha calculation (for 0/255 checkerboard) comprises:

$$C_{r1} = RGB * alpha$$

$$C_{r2} = RGB * alpha + 255 * (1 - alpha)$$

$$alpha = 1 + (C_{r1} - C_{r2})/255$$

In order to perform RGB reconstruction, an ARGB reconstruction process is performed. The ARGB reconstruction process (example for Red) comprises:

```
if (pattern==0) //( C_r1 is available and real, C_r1=RGB*alpha)
    if (alpha<=th3)
        out_R=0;
    else
        out_R=min(max_value, round(C_r1/alpha));
    end
else //( C_r2 is available and real, C_r2=RGB*alpha+255*(1-alpha))
    if (alpha_est<= th3)
        out_R=0;
    else
        temp=max(0, C_r2_R-255*(1-alpha)))
        out_R=min(max_value, round(temp/alpha));
    end
end
```

In the above, max_value=255 for 8-bit data, and max_value=1023 for 10-bit data.

Refer to FIGS. 9-13, which are diagrams illustrating RGB image data, alpha channel data, mixed image data (RGB+alpha channel blended), reconstructed RGB simulation results, and reconstructed alpha channel simulation results of the device and method for blending image data and the alpha channel and reconstructing to obtain the image again after transmission according to an embodiment of the present invention.

In summary, the present invention provides an electronic device for layer blending and reconstruction based on an alpha channel comprising an encoder for layer blending the alpha channel and red-green-blue (RGB) image data to obtain blended image data, blending transporter image data with 1-alpha channel data to obtain a transporter, blending the transporter with the blended image data to obtain mixed image data, and transmitting the mixed image data to a decoder and the decoder for receiving the mixed image data from the encoder, removing the transporter from the mixed image data to obtain blended image data, and reconstructing the red-green-blue (RGB) image data and the alpha channel from the blended image data.

The electronic device for layer blending and reconstruction based on an alpha channel in some embodiments comprises, for decoder processing, $C_{r1}$=RGB*alpha, $C_{r2}$=RGB*alpha+255*(1-alpha), and alpha=1+($C_{r1}$-$C_{r2}$)/255, where $C_{r1}$ is obtained from $C_{r2}$ in left, right, top, and bottom positions and where different costs are calculated to determine interpolation direction.

The method of layer blending and reconstruction based on an alpha channel in some embodiments comprises, layer blending the alpha channel and red-green-blue (RGB) image data to obtain blended image data, blending transporter image data with 1-alpha channel data to obtain a transporter, and blending the transporter with the blended image data to obtain mixed image data.

The method of layer blending and reconstruction based on an alpha channel of the present invention in some embodiments comprises receiving mixed image data, removing transporter image data from the mixed image data to obtain blended image data, and reconstructing red-green-blue (RGB) image data and the alpha channel from the blended image data.

The method of layer blending and reconstruction based on an alpha channel of the present invention in some embodiments comprises receiving mixed image data, determining if a mode flag is set, the mode flag indicating ARGB mode when set and RGB mode when not set, performing a cost calculation when in ARGB mode, performing a $C_{r1}/C_{r2}$ estimation, performing an alpha calculation, performing alpha smoothing, and performing ARGB reconstruction based on the $C_{r1}/C_{r2}$ estimation, the alpha smoothing, and transporter image data.

While the present disclosure has been described by means of specific embodiments, numerous modifications and variations could be made thereto by those skilled in the art without departing from the scope and spirit of the present disclosure.

What is claimed is:

1. A method of layer blending and reconstruction based on an alpha channel comprising:
   receiving mixed image data;
   removing transporter image data from the mixed image data to obtain blended image data;
   reconstructing red-green-blue (RGB) image data and the alpha channel from the blended image data;
   calculating a plurality of cost values based on the mixed image data;
   interpolating an estimated value of Cr1 or Cr2 according to the plurality of cost values; and
   calculating an alpha value according to the estimated value of Cr1 or Cr2 according to expressions of Cr1=RGB*alpha, Cr2=RGB*alpha+255*(1-alpha), and alpha=1+(Cr1−Cr2)/255.

2. The method of layer blending and reconstruction based on an alpha channel of claim 1, wherein the RGB image data comprises 30-bit RGB image data.

3. The method of layer blending and reconstruction based on an alpha channel of claim 1, wherein the alpha channel comprises an 8-bit alpha channel.

4. The method of layer blending and reconstruction based on an alpha channel of claim 1, wherein the transporter image data comprises a checkerboard pattern.

5. The method of layer blending and reconstruction based on an alpha channel of claim 1, wherein the transporter image data comprises a colored checkerboard pattern.

6. An electronic device for layer blending and reconstruction based on an alpha channel comprising:
   a decoder for receiving mixed image data; removing transporter image data from the mixed image data to obtain blended image data; and reconstructing red-green-blue (RGB) image data and the alpha channel from the blended image data,
   wherein the decoder is configured to:
   calculate a plurality of cost values based on the mixed image data,
   interpolate an estimated value of Cr1 or Cr2 according to the plurality of cost values; and
   calculate an alpha value according to the estimated value of Cr1 or Cr2 according to expressions of Cr1=RGB*alpha, Cr2=RGB*alpha+255*(1-alpha), and alpha=1+(Cr1−Cr2)/255.

7. The electronic device for layer blending and reconstruction based on an alpha channel of claim 6, wherein the RGB image data comprises 30-bit RGB image data.

8. The electronic device for layer blending and reconstruction based on an alpha channel of claim 6, wherein the alpha channel comprises an 8-bit alpha channel.

9. The electronic device for layer blending and reconstruction based on an alpha channel of claim 6, wherein the transporter image data comprises a checkerboard pattern.

10. The electronic device for layer blending and reconstruction based on an alpha channel of claim 6, wherein the transporter image data comprises a colored checkerboard pattern.

11. An electronic device for layer blending and reconstruction based on an alpha channel comprising:
    an encoder for layer blending the alpha channel and red-green-blue (RGB) image data to obtain blended image data; blending transporter image data with 1-alpha channel data to obtain a transporter; blending the transporter with the blended image data to obtain mixed image data; and transmitting the mixed image data to a decoder; and
    the decoder for receiving the mixed image data from the encoder; removing the transporter from the mixed image data to obtain blended image data; and reconstructing the red-green-blue (RGB) image data and the alpha channel from the blended image data,
    wherein the decoder is configured to:
    calculate a plurality of cost values based on the mixed image data,
    interpolate an estimated value of Cr1 or Cr2 according to the plurality of cost values; and
    calculate an alpha value according to the estimated value of Cr1 or Cr2 according to expressions of Cr1=RGB*alpha, Cr2=RGB*alpha+255*(1-alpha), and alpha=1+(Cr1−Cr2)/255.

12. The electronic device for layer blending and reconstruction based on an alpha channel of claim 11, wherein the RGB image data comprises 30-bit RGB image data.

13. The electronic device for layer blending and reconstruction based on an alpha channel of claim 11, wherein the alpha channel comprises an 8-bit alpha channel.

14. The electronic device for layer blending and reconstruction based on an alpha channel of claim 11, wherein the transporter image data comprises a checkerboard pattern.

15. The electronic device for layer blending and reconstruction based on an alpha channel of claim 11, wherein the transporter image data comprises a colored checkerboard pattern.

* * * * *